US006516411B2

United States Patent
Smith (10) Patent No.: US 6,516,411 B2
(45) Date of Patent: *Feb. 4, 2003

(54) METHOD AND APPARATUS FOR EFFECTING SECURE DOCUMENT FORMAT CONVERSION

(75) Inventor: Jeffrey C. Smith, Menlo Park, CA (US)

(73) Assignee: Tumbleweed Communications Corp., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/013,765

(22) Filed: Dec. 10, 2001

(65) Prior Publication Data

US 2002/0042876 A1 Apr. 11, 2002

Related U.S. Application Data

(62) Division of application No. 09/715,940, filed on Nov. 17, 2000, which is a continuation of application No. 09/122,619, filed on Jul. 23, 1998, now Pat. No. 6,151,675.

(51) Int. Cl.[7] ................................................. H04L 9/00
(52) U.S. Cl. ....................................... 713/153; 713/200
(58) Field of Search ................................. 713/153, 151, 713/152, 162, 200; 380/281, 285; 709/230, 232, 246

(56) References Cited

U.S. PATENT DOCUMENTS

| | | | |
|---|---|---|---|
| 4,713,780 A | 12/1987 | Schultz et al. | 709/206 |
| 4,754,428 A | 6/1988 | Schultz et al. | 709/246 |
| 5,283,887 A | 2/1994 | Zachery | 707/513 |
| 5,404,231 A | 4/1995 | Bloomfield | 358/400 |
| 5,416,842 A | 5/1995 | Aziz | 380/30 |
| 5,424,724 A | 6/1995 | Williams et al. | 370/403 |
| 5,511,122 A | 4/1996 | Atkinson | 713/153 |
| 5,513,126 A | 4/1996 | Harkins et al. | 709/228 |
| 5,602,918 A | 2/1997 | Chen et al. | 713/153 |
| 6,092,114 A | 7/2000 | Shaffer et al. | 709/232 |
| 6,260,043 B1 | 7/2001 | Puri et al. | 707/101 |

Primary Examiner—Matthew B. Smithers
(74) Attorney, Agent, or Firm—Skadden, Arps, Slate Meagher & Flom LLP (57) ABSTRACT

A method and apparatus is provided for effecting secure document delivery in any of various document formats. A document is encrypted with the public key of a server associated with the recipient of the document, instead of with the public key of the intended recipient. The receiving server is located within a firewall. The encrypted document is forwarded to the server within the firewall. The server decrypts the document using its corresponding private key, converts the document to a now data representation, and then either forwards the document to the recipient inside the firewall, or re-encrypts the document with the public key of an intended recipient outside of the firewall or with the public key of another server that is associated with the intended recipient of the document.

10 Claims, 10 Drawing Sheets

METHOD AND APPARATUS FOR EFFECTING SECURE DOCUMENT FORMAT CONVERSION

This application is a divisional of U.S. application Ser. No. 09/715,940, filed on Nov. 17, 2000, which is a continuation of U.S. application Ser. No. 09/122,619, filed Jul. 23, 1998, now U.S. Pat. No. 6,151,675.

BACKGROUND OF THE INVENTION

1. Technical Field

The invention relates to electronic document delivery. More particularly, the invention relates to a method and apparatus for effecting secure document delivery and format conversion.

2. Description of the Prior Art

One of the many complexities associated with delivering information between two disparate systems stems from basic incompatibilities between those systems including, for example, differences in capabilities. A printer has a very different set of capabilities than a personal computer, and a commensurate set of data formats which the printer might accept. A personal computer, for example, might be capable of processing a WordPerfect document, a portable document (e.g., Adobe Acrobat or Novell Envoy), or an HTML document. A printer, by contrast, might only be capable of accepting a PCL file or a Postscript file. A fax machine, as with a printer, may only accept a Group 3 compresses black and white raster representation of a document. Thus, various devices have various capabilities in terms of the types of data they may accept.

Similarly, different data types offer different levels of flexibility and function. For example, an Envoy or PDF file can be scaled to any resolution, can support millions of colors, and can include text and fonts. A Group 3 compressed fax image, on the other hand, is limited in resolution, only supports black and white colors, and includes no text or fonts, thereby limiting the ability of a recipient of a Group 3 compressed image to perform any operations, except for rudimentary operations.

The extended flexibility of a more robust data representation, such as a portable document, enables such documents to be converted to less robust representations. By illustration, a portable document might be converted to a Postscript file or even a Group 3 compressed image. One might therefore suggest that a portable document is a high level data representation and a Group 3 compressed image is a low level data representation.

In most cases, if the recipient system is capable of receiving a high level data representation, such representation is the data representation of choice due to the increased capabilities such representation provides. Thus, such representation offers a preferred common format, especially if such representation includes a mechanism that can convert the high level representation to a lower level representation as necessary.

M. Williams, R. Yun, Method and Apparatus For Enhanced Electronic Mail Distribution, U.S. Pat. No. 5,424,724 (Jun. 13, 1995) disclose a method and apparatus for enhanced electronic mail distribution which permits distribution of electronic mail documents to multiple host systems and/or external networks via a single host agent. A host agent reference table is established at selected host agents within a local network. Each host agent reference table includes an identification of selected destination nodes associated with an identified host agent for those nodes. A referral to the host agent reference table is used to determine the appropriate host agent for an electronic document destined for a selected node.

No provision is made within this -method -and apparatus*., or A~t' conversion. Thus, documents are delivered with its level of representation unaltered and without regard for processing capability at a destination node.

T. Schultz, A. Gross, B. Pappas. G. Shifrin, L. Mack, Apparatus and Method of Distributing Documents To Remote Terminals With Different Formats, U.S. Pat. No. 4,754,428 (Jun. 28, 1988) and T. Schultz, A. Gross, B. Pappas. G. Shifrin, L. Mack, Electronic Mail, U.S. Pat. No. 4,713,780 (Dec. 15, 1987) disclose a method and apparatus for delivering a document originated at a local site by a source having a printer output that is normally connected to a printer, to one or more remote locations having printers or display devices that may differ from the printer normally connected to the printer output of the document generating source. Printer command signals which are normally provided at the printer output are converted to character and position data which represent the respective characters and their horizontal and vertical positions on each page of the document. The character and position data are transmitted to a remote location and reconverted to a form for driving a printer or other display device to produce a line-for-line conforming copy of the original.

The '428 and '780 patents disclose the use of upstream data conversion, but do not provide downstream data conversion. That is, the '428 and '780 patents disclose a method and apparatus that allows text to be sent to a printer and converted to a printer specific format. However, such method and apparatus lacks the ability to start with a high-level representation of the data, and only convert to a lower level representation if such conversion is determined to be necessary. Thus, such approach is not satisfactory where printer format is not known or established prior to document origination, or where a heterogeneous network, such as the Internet, is used to deliver data.

L. Harkins, K. Hayward, T. Herceg, J. Levine, D. Parsons, Network Having Selectively Accessible Recipient Prioritized Communication Channel Profiles, U.S. Pat. No. 5,513,126 (Apr. 30, 1996) discloses a method for a sender to automatically distribute information to a receiver on a network using devices and communications channels defined in a receiver profile. The receiver profile establishes the properties and mode for receipt of information for receivers on the network and the profile is published in a network repository for all network users or is accessible for selected groups or individuals on the network. The disclosed network does not provide for data conversion, but rather involves sending predetermined data based on the capabilities of the recipient which are communicated through channels. Thus, each recipient must first establish a format before data are exchanged.

M. Bloomfield, Sender-Based Facsimile Store and Forward Facility, I.S. U.S. Pat. No. 5,404,231 (Apr. 4, 1995) discloses a system that provides sender-based store and forward services for delivering facsimile based information. The system is solely concerned with the delivery of facsimile bitmap images, and not with data conversion.

In view of the limitations attendant with the state of the art, it would be advantageous to provide a system in which the ability to descend to a lower level representation is preserved to allow the flexibility to do so at a future point in time, but that also enables a richer set of functions as appropriate.

One potential shortcoming of the above referenced scheme occurs when secure document delivery is desired. For example, a document may be encrypted with the public key of an intended recipient to prevent unauthorized access to the document. To convert the format of the data within the document, it is first necessary to decrypt the document. Thereafter, the format of the data within the document may be converted and the converted document may then be encrypted. Unfortunately, decrypting the document defeats the purpose of any security that may have been provided to restrict access to the document. That is, the document is readily accessed once it has been decrypted.

J. Chen, J.-S. Wang, Application Level Security System and Method, U.S. Pat. No. 5,602,918 (Feb. 11, 1997) disclose a system and method for establishing secured communications pathways across an open unsecured network by providing secured gateways or a firewall between the Internet and any party which desires protection. The disclosed technique uses a smart card to distribute shared secret keys between a computer which serves as the firewall and a client node on the Internet. The shared private keys establish mutual authentication between the gateway and the smart card. A session or temporary secret key is generated for use in further communications between the gateway and the client node once communications have been established. Further communications are encrypted using the session key. While this approach provides one approach for securing communications across a network, it is not concerned with maintaining security while at the same time allowing document format conversion to occur.

R. Atkinson, Intermediate Network,Authentication, U.S. Pat. No. 5,511,122 (Apr. 23, 1996) discloses an internetwork authentication method for verifying a, sending host by a receiving host or an intermediate router or gateway. The network address and public key of a receiving host is obtained. The pubic key from the receiving host is used in combination with a private key of the originating host to generate a cryptographic signature. The signature and data are transmitted through a first subnetwork in at least one packet which packet is received at the receiving host. The receiving host uses the private key of the receiving host site and a public key of the originating host to verify the cryptographic signature. While the document discloses a symmetrical form of private key-pubic key cryptography, there is no teaching with regard to secure document format conversion.

A. Aziz, Method and Apparatus for Key-Management Scheme for Use with Internet Protocols at Site Firewalls, U.S. Pat. No. 5,416,842 (May 16, 1995) discloses a key management scheme for encryption of Internet protocol (IP) data packets between site firewalls. In this scheme, IP packets only from site firewall to site firewall are encrypted. Accordingly, only the firewall servers need to participate in the scheme. When a firewall receives an IP packet from an interior site node intended for a remote firewall, it encrypts; the IP packet and sends it encapsulated in another IP packet destined for the remote firewall. The remote firewall decrypts the encapsulated packet and sends it in the clear to the destination node on the interior side of the remote firewall. Accordingly, it is known to encapsulate a document in a secure packet, such that encryption/decryption is performed between two firewalls on the outside of the firewalls. Unfortunately, such scheme does not allow secure conversion of a document format. That is, once the packet is decrypted, the document is no longer secure. Even though the document is now inside the firewall, and thus presumed to be secure, no technique is disclosed that allows the document to be converted to a different format.

It would be advantageous to provide a technique for effecting secure document delivery in any of various document formats.

SUMMARY OF THE INVENTION

The invention provides a method and apparatus for effecting secure document delivery in any of various document formats. The invention encrypts the document with the public key of a server associated with the recipient of the document, instead of encrypting the document with the public key of the intended recipient. For purposes of the invention, it is assumed that the receiving server is located within a firewall. The encrypted document is forwarded to the server within the firewall.

The server decrypts the document using its corresponding private key, converts the document to a new data representation, and then either forwards the document to the recipient inside the firewall, or re-encrypts the document with the public key of an intended recipient outside of the firewall or with the public key of another server that is associated with the intended recipient of the document.

DETAILED DESCRIPTION

The invention incorporates a technique that defers the decision to descend to a lower level representation, thereby preserving the flexibility to do so at a future point in time, while also enabling a richer set of functions. This technique is disclosed in J. Smith, et al., "Distributed Dynamic Document Conversion Server," U.S. patent application Ser. No. 08/792,171, filed Jan. 30, 1997.

The preferred embodiment of the invention provides a method and apparatus for effecting secure document delivery in any of various document formats. One embodiment of the invention encrypts the document with the public key of a server associated with the recipient of the document, instead of encrypting the document with the public key of the intended recipient. For purposes of the invention, it is assumed that the receiving server is located within a firewall. In this way, secure conversion of the document format is assured.

The encrypted document is forwarded to the server within the firewall. The server decrypts the document using its corresponding private key, converts the document to a new data representation, and then either forwards the document to the recipient inside the firewall, or (in an alternate, equally preferred embodiment of the invention) re-encrypts the document with the public key of an intended recipient outside of the firewall or with the public key of another server that is the intended recipient of the document.

Figure 1:
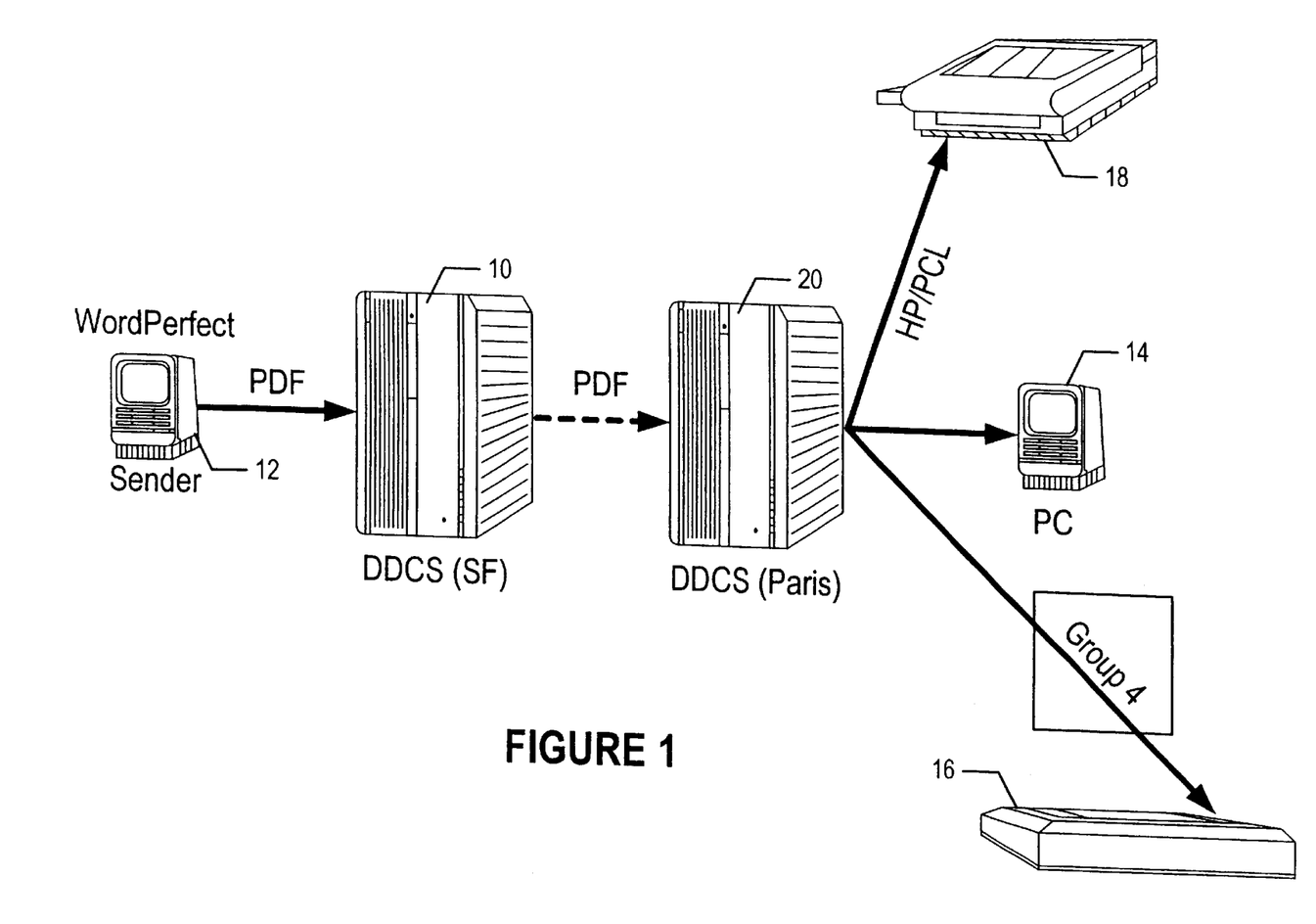
FIG. 1 is a block schematic diagram that shows an example of an application involving a dynamic document conversion server.

FIG. 1 is a block schematic diagram that shows an example of an application involving a dynamic document conversion server (DDCS) which may be used in connection with the invention to effect document conversion. It should be appreciated that the DDCS described herein is provided for purposes of illustration and example, and that the invention may be practiced with other format conversion techniques.

To illustrate and document the architecture of the DDCS, consider an example. Suppose a sender 12 of a WordPerfect document wants to distribute a formatted document to a recipient. Suppose the sender does not know what capabilities the recipient may or may not possess, including whether the recipient is a desktop computer 14, a facsimile machine 16, or printer 18. In such case, the sender could opt to convert the document to a low level representation and then send that representation. However, if the recipient possesses a computer capable of receiving a higher level representation, then the recipient may lose such features of the document as color, scalability, or content. Hence, the premature conversion of a document to a lower level representation limits the flexibility and function for the recipient.

If the sender sends, for example, a portable document representation of the WordPerfect document, thus preserving the document in a high level representation, without offering the capabilities of the DDCS for converting the document and the recipient turns out to be a printer, then the delivery fails.

Neither example above offers an optimal solution—i.e. distributing the best data representation to the recipient, where best is defined as the highest level representation based on the initial format of the data, as well as the capabilities of the recipient.

With the DDCS, the sender 12 of the document sends data to the recipient via the DDCS server 10, thus introducing a level of indirection between send and receive. The data are delivered from the sender to the DDCS server in a high level representation. The DDCS server may propagate the data, bringing the data closer to the intended recipient. At each step, the DDCS can dynamically convert the data from a high level representation to a lower level representation, based on the data to be delivered and the next server or recipient's capabilities. Ultimately, a terminal DDCS server 20 delivers the document to the recipient, making a final data conversion if necessary.

Suppose in the above example of a WordPerfect document, the sender 12 runs a Macintosh computer with WordPerfect, and the receiver is a fax machine 16. In this case, the sender transfers a high level representation of the WordPerfect document to the initial DDCS server 10. The conversion of the document from WordPerfect to a portable, high level representation, such as PDF, is transparent to the user. Such conversion may be performed by either the sender or by the initial DDCS in any known manner, for example with regard to the PDF format, as is readily offered by Adobe Acrobat. The initial DDCS server accepts the PDF document, and then initiates a transfer to the recipient, based upon standard network protocols. In this case, assume that the sender is located in San Francisco, while the recipient fax machine is in Paris. The DDCS server forwards the PDF document to another DDCS server 20 in Paris. This second DDCS server then attempts to forward the document to the recipient. At the point of delivery, the second DDCS server learns, via database lookup or interactive dialog with the recipient, that the recipient is in fact a fax machine. The Paris DDCS server then discovers what capabilities the fax machine possesses. In this example, the fax machine supports Group 4 compressed images. The Paris DDCS server then dynamically converts the PDF document to a Group 4 compressed image using known techniques. In this case, Group 4 compressed, black and white, 200 by 100 dots per inch is determined to be the best representation.

Suppose, by contrast, that the Paris DDCS server 20 instead discovers that the recipient is a Hewlett-Packard Color Deskjet printer 18. In this case, the Paris DDCS server converts the document from PDF to the lower level HP Printer Control Language using conventional techniques. Unlike the previous case, the best representation in this case is color, 360 by 300 dots per inch.

Suppose, once more for contrast, the Paris DDCS server 20 discovers the recipient has a personal computer 14 running the DOS operating system. In this case, the Paris DDCS server sends a textual representation of the document to the recipient.

If the Paris DDCS server discovers that the recipient has a personal computer running the Windows operating system, with the Acrobat application installed (a program capable of reading a PDF file), the server forwards the PDF representation of the document.

FIGS. 2a–2e provide a series of block schematic diagrams which illustrate secure document conversion in accordance with a first preferred embodiment of the invention.

Figure 2A:
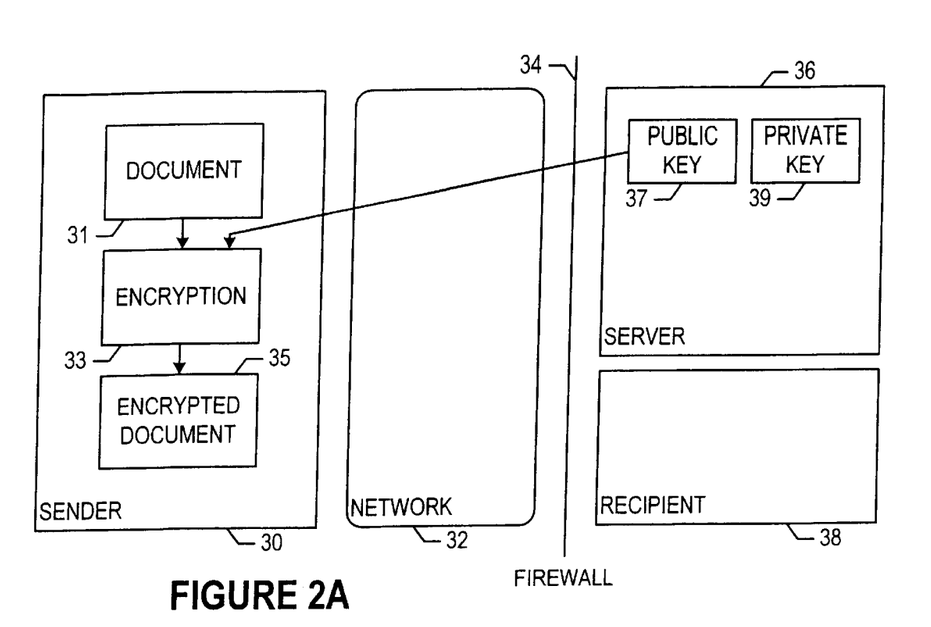
FIGS. 2a–2e provide a series of block schematic diagrams which illustrate secure document conversion in accordance with a first preferred embodiment of the invention.

As shown in FIG. 2a, a sender 30 uses the public key 37 of a server 36 to perform encryption 33 on a document 31, thereby producing an encrypted document 35.

Figure 2B:
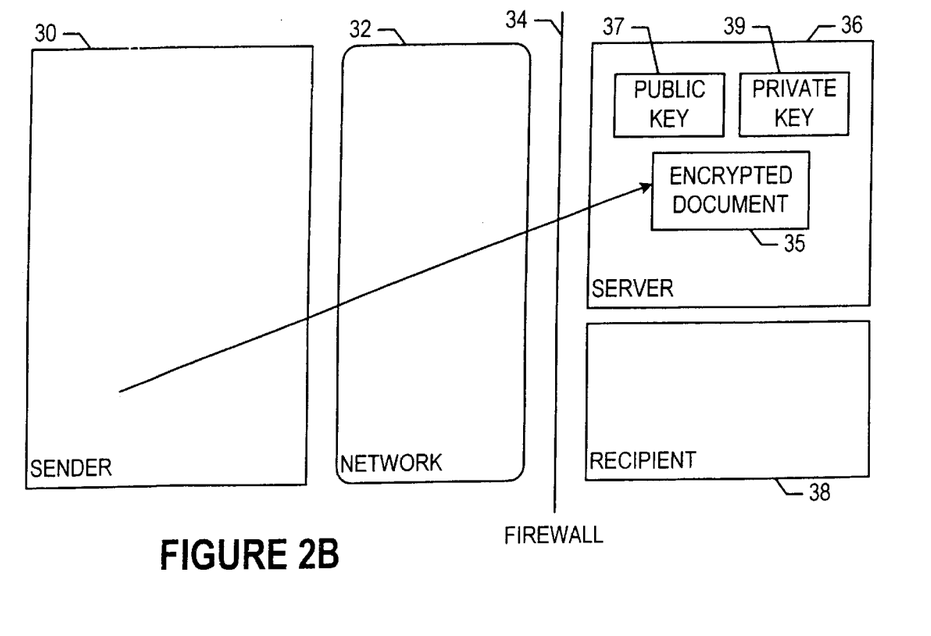
Figure 2C:
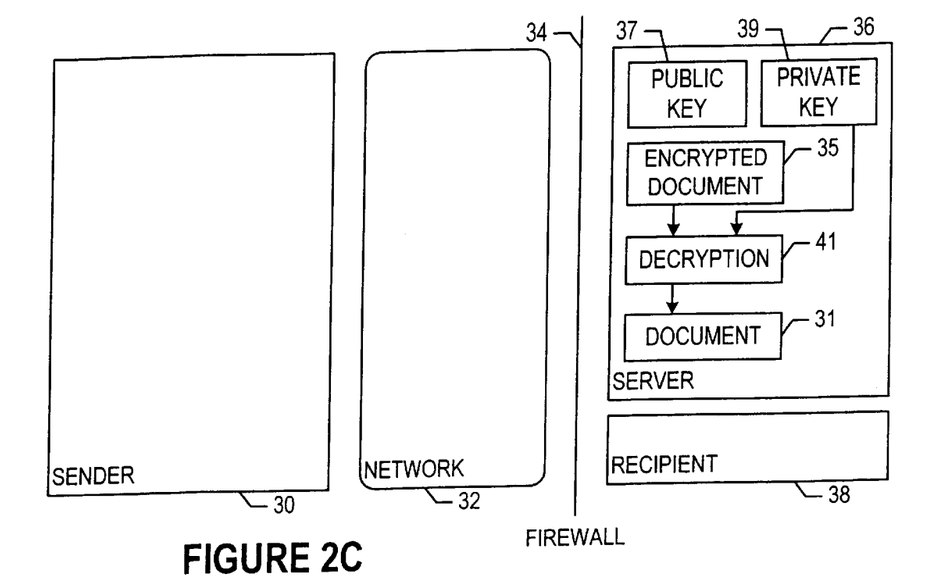
Figure 2D:
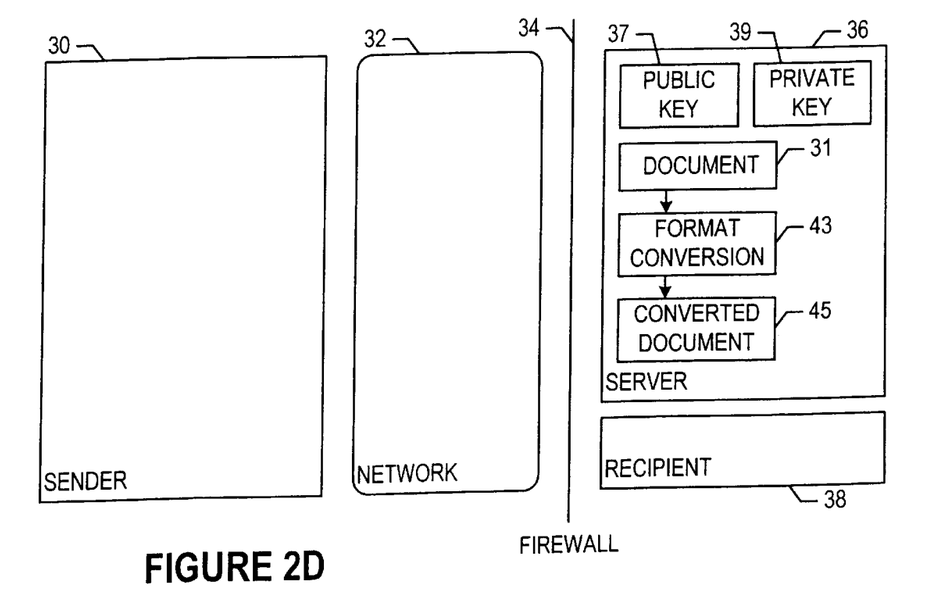
Figure 2E:
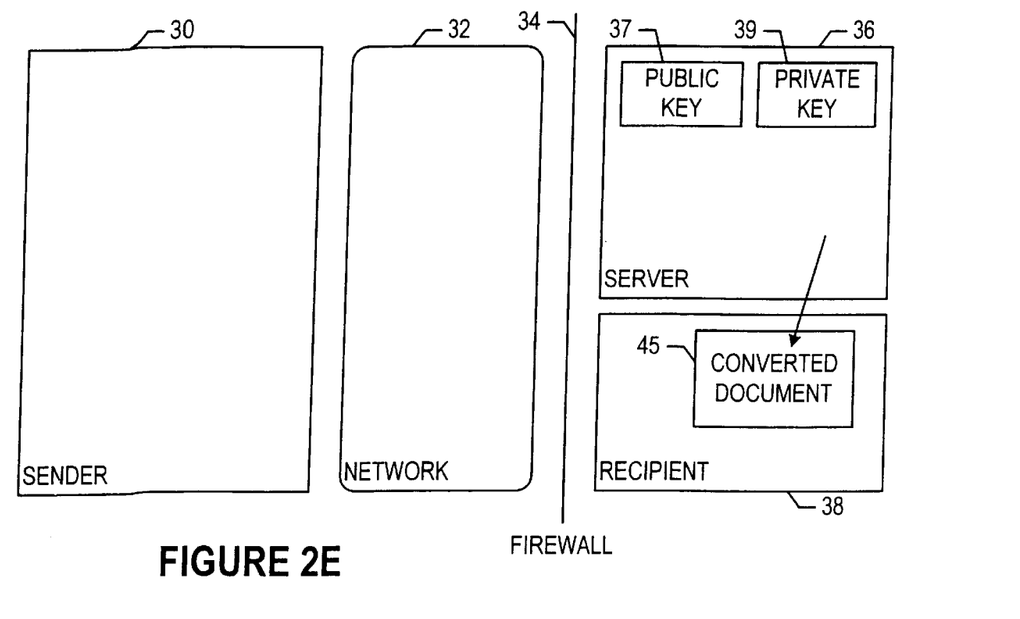

In FIG. 2b, the sender 30 sends the encrypted document over a network 32 to the server 36. Significantly, the server is isolated from the network by a firewall 34. For purposes of practicing the invention, any type of firewall may be used (as is known in the art—see, for example, the discussion above regarding the background of the invention). By using a firewall, all processing of the encrypted document takes place in a secure environment. Thus, it is safe to decrypt the document (FIG. 2c) using a decryption scheme 41 in conjunction with the server's private key 39. Because the document is now safe behind the firewall, e.g. within a private, supervised intranet or other secure network, the document may be converted (FIG. 2d) using a format conversion scheme 43, such as that discussed above in connection with FIG. 1. Thereafter, the converted document 45 is readily delivered to a recipient 38 (FIG. 2e) behind the firewall.

Figure 3A:
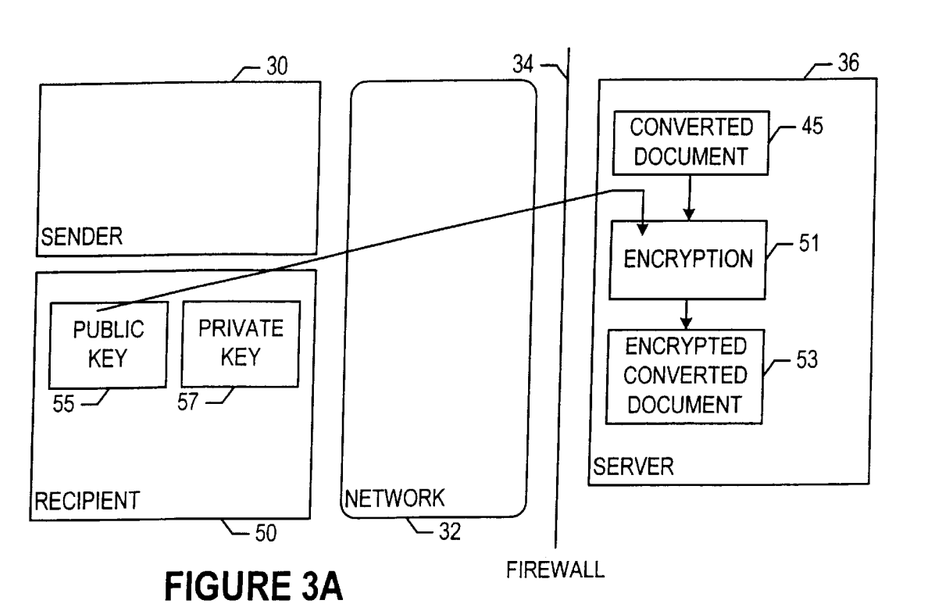
FIGS. 3a–3c provide a series of block schematic diagrams which illustrate secure document conversion in accordance with a second, equally preferred embodiment of the invention.
Figure 3B:
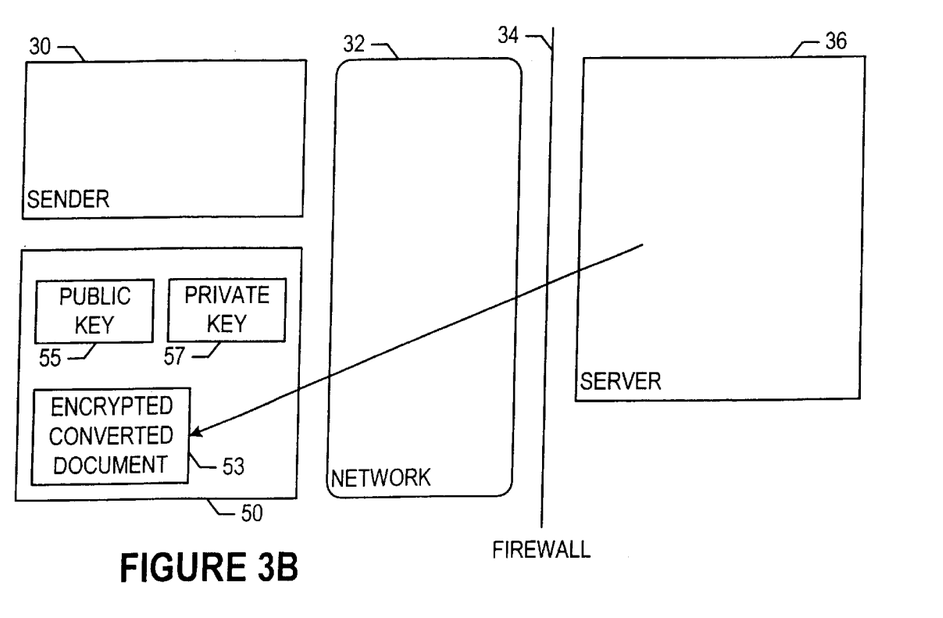
Figure 3C:
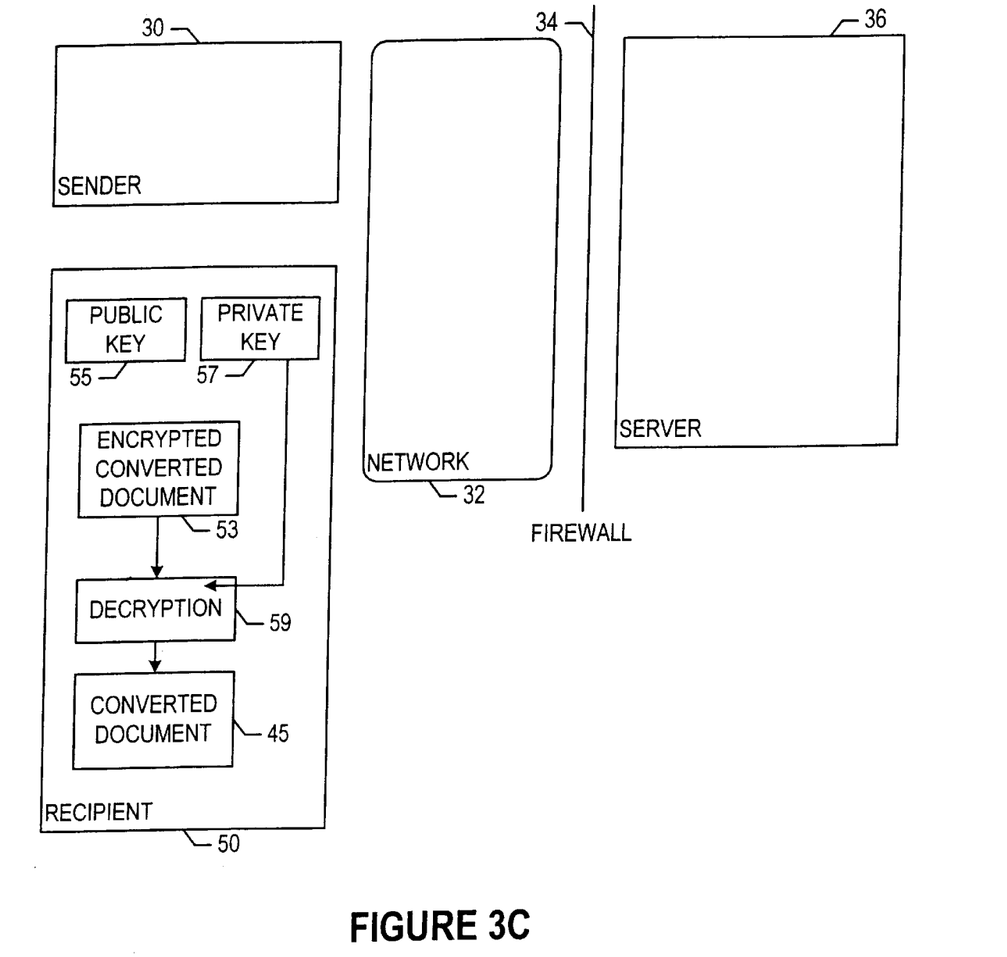

FIGS. 3a–3c provide a series of block schematic diagrams which illustrate secure document conversion in accordance with a second, equally preferred embodiment of the invention. For purposes of understanding FIGS. 3a–3c it is assumed that a document has been sent to the server 36 and document conversion has taken place, as discussed above in connection with FIGS. 2a–2e.

In FIG. 3a, the recipient 50 sends its public key 55 to the server via the network. The server uses the recipient's public key to perform an encryption step 51 on the converted document 45. This results in an encrypted, converted document 53.

The encrypted, converted document is then sent, via the network, to the recipient 50 (FIG. 3b). Significantly, this embodiment of the invention provides a technique for performing secure document conversion. That is, the encrypted document is decrypted and converted in a secure, private network behind the firewall. The converted document is then encrypted before it is sent to the recipient, which is located outside of the secure environment established by the firewall. Once the document is received by the recipient (FIG. 3c), the recipient's private key 57 is used to perform a decryption step 59 which recovers the converted document 45.

Figure 4A:
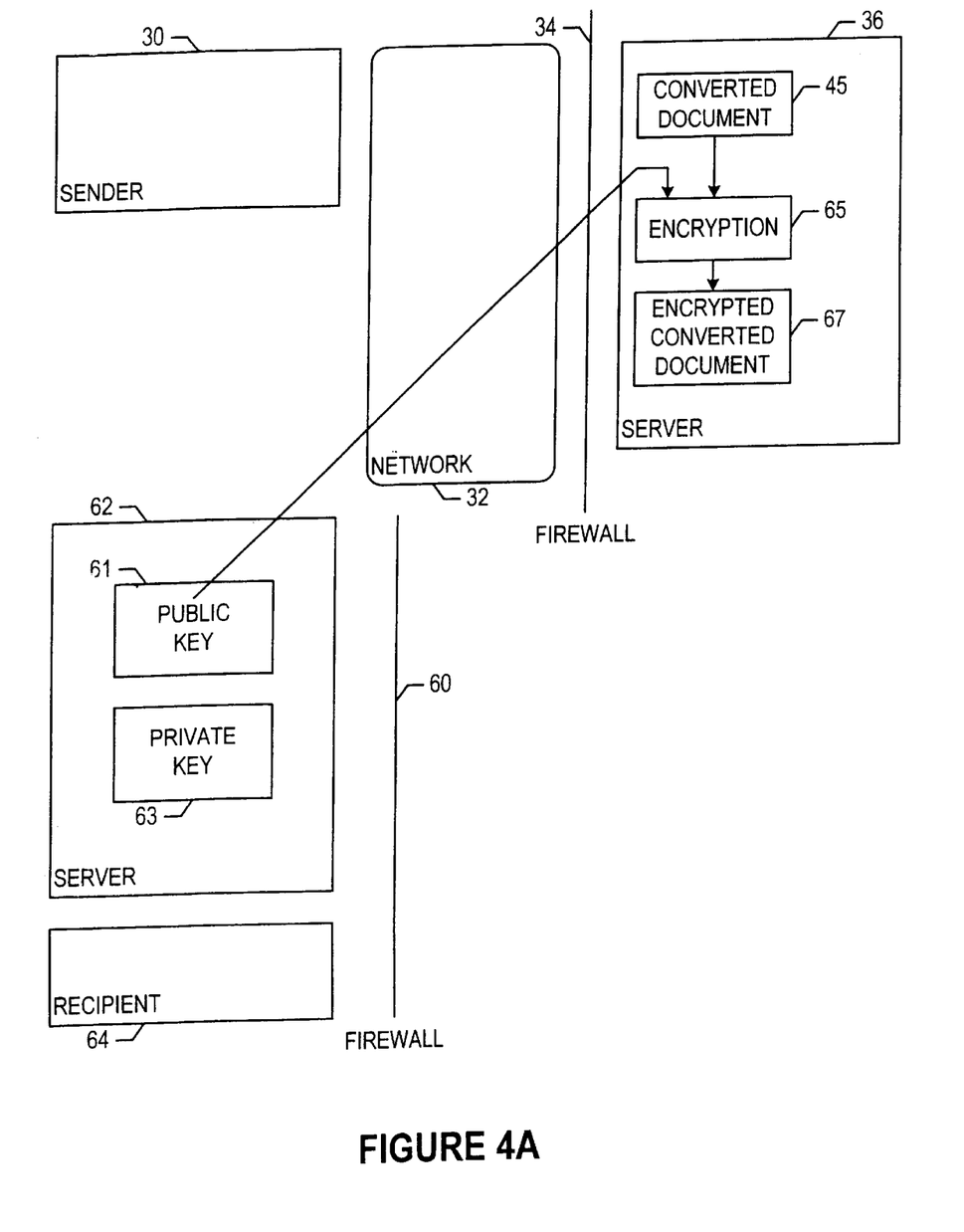
FIGS. 4a–4d provide a series of block schematic diagrams which illustrate secure document conversion in accordance with a third, equally preferred embodiment of the invention.
Figure 4B:
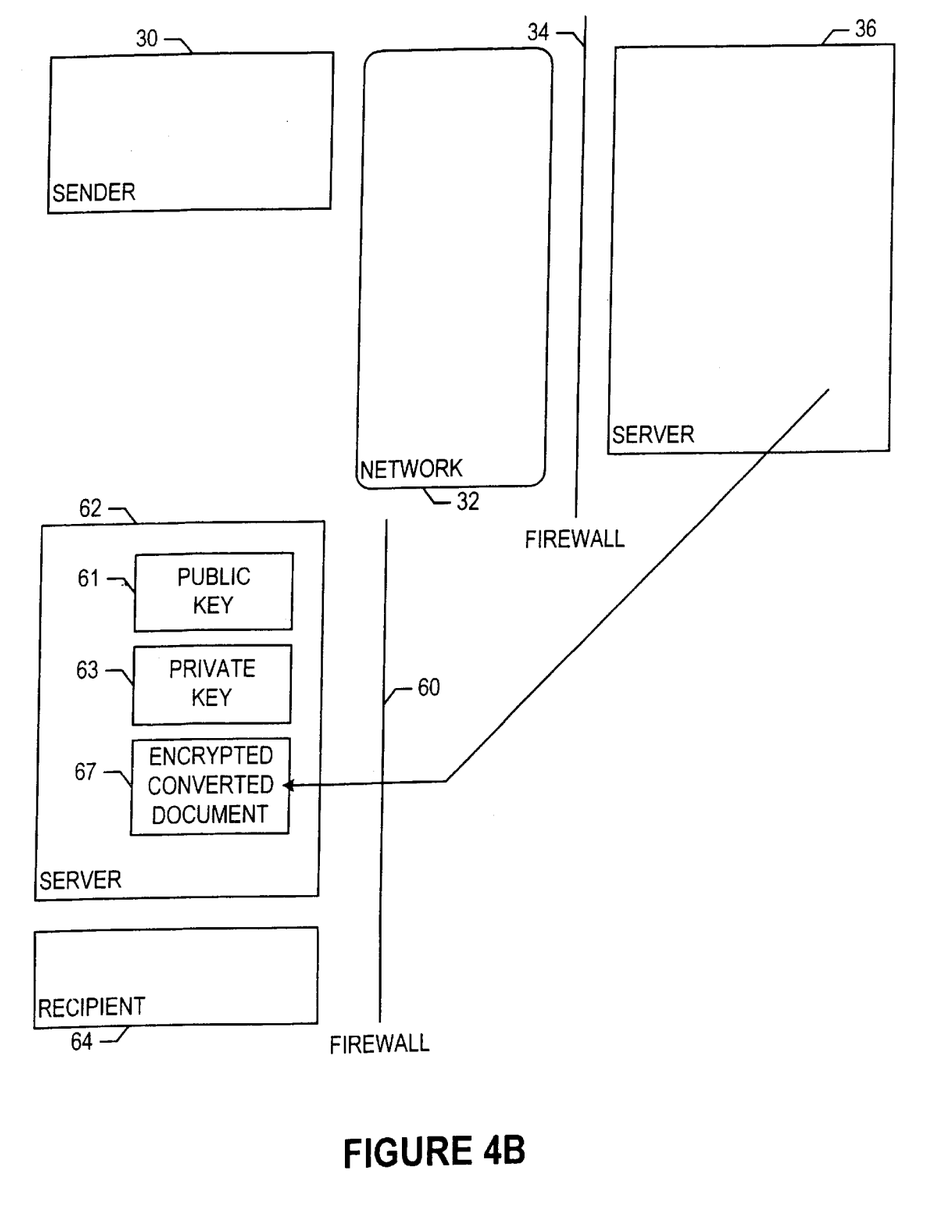

FIGS. 4a–4d provide a series of block schematic diagrams which illustrate secure document conversion in accordance with a third, equally preferred embodiment of the invention. In this embodiment of the invention, the document is encrypted, forwarded to a server located behind a firewall, and converted, all as described above in connection with FIGS. 2a–2e. The converted document is encrypted during an encryption step 65 using the public key 61 of a remote server 62 (FIG. 4a). The converted, encrypted document 67 is sent via the network 32 to the remote server 62 (FIG. 4b). Significantly, the remote server is also located in a secure environment behind a firewall 60.

Figure 4C:
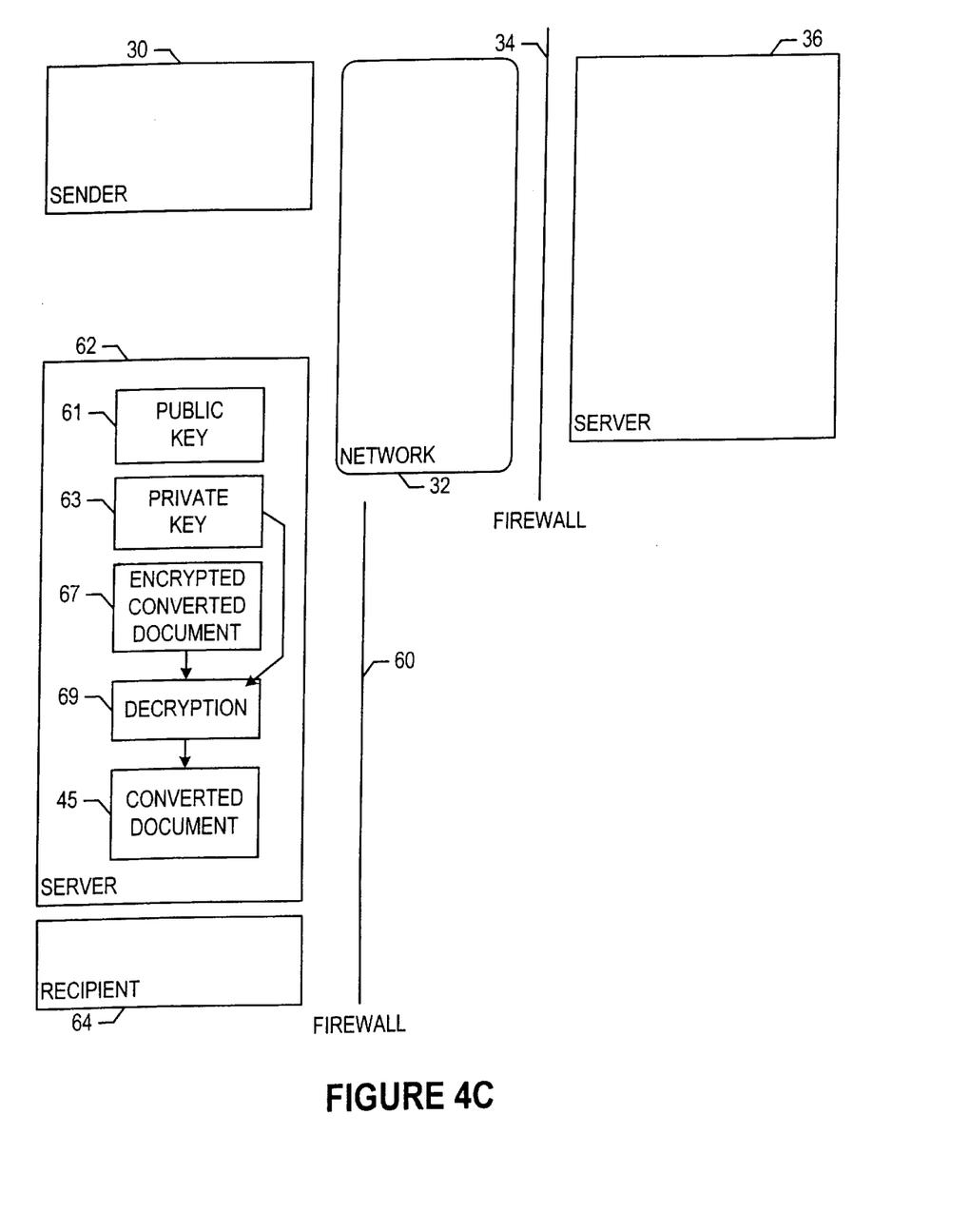
Figure 4D:
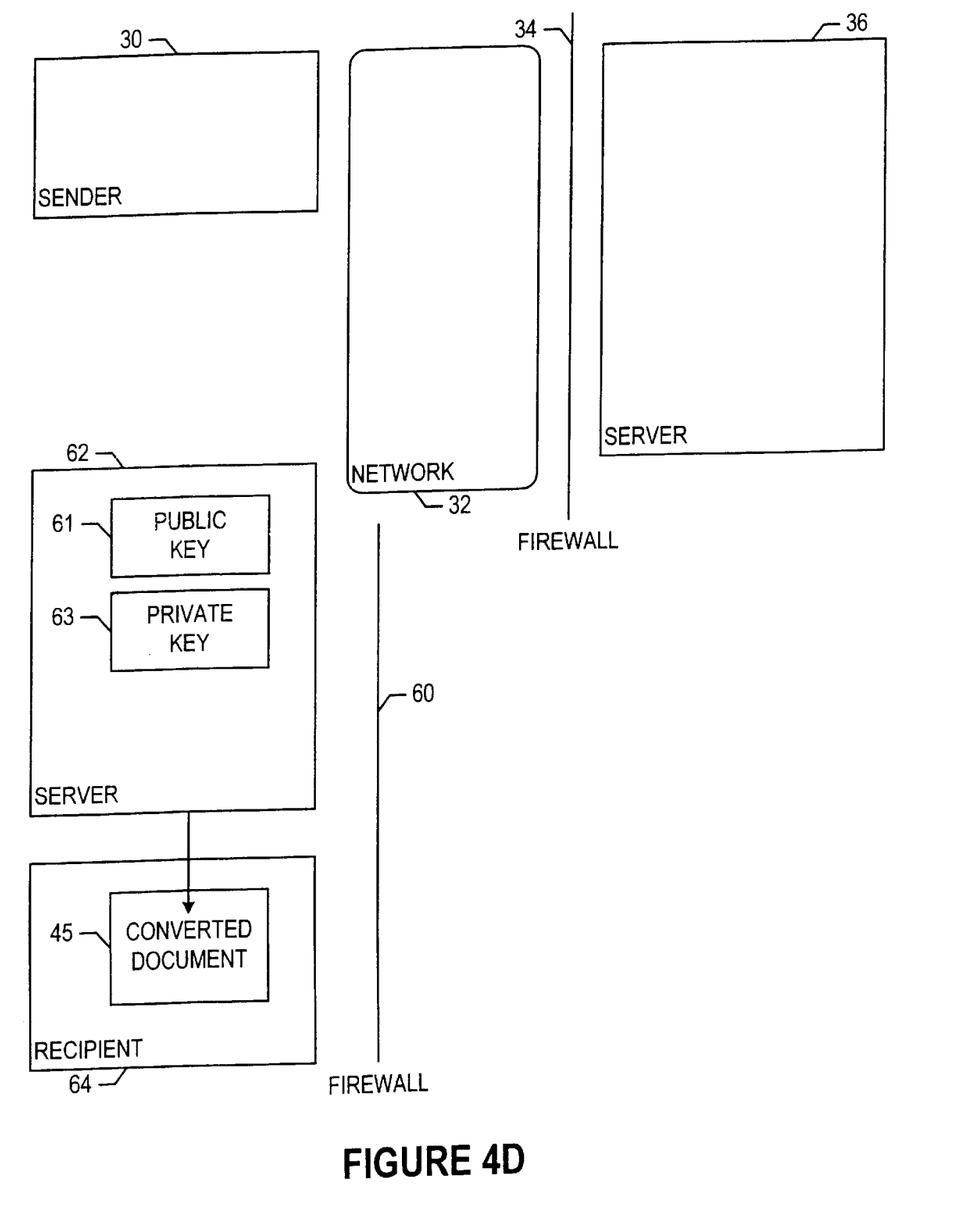

The remote server uses its private key 63 to perform a decryption step 69, and thereby recover the converted document 45. (FIG. 4c). The converted document is then forwarded to the recipient 64 (FIG. 4d).

It should be noted that document conversion is performed in a secure environment in all embodiments of the invention. Thereafter, the converted document is forwarded to a recipient in a secure fashion, either within the conversion server's secure environment (i.e. behind the firewall) or via a secure delivery technique, e.g. by reencrypting the document after it is converted and forwarding the encrypted, converted document directly to the recipient or to a server associated with the recipient.

Although the invention is described herein with reference to the preferred embodiment, one skilled in the art will readily appreciate that other applications may be substituted for those set forth herein without departing from the spirit and scope of the present invention. For example, while the invention is described herein in connection with public key-private key encryption scheme, it will be appreciated by those skilled in the art that other forms of cryptography may be used.

The above description is illustrative only and is not limiting. The present invention is limited only by the claims which follow.

I claim:

1. A method for effecting secure document delivery in any of a plurality of document formats, comprising the steps of:

encrypting said document with a public key of a server associated with a recipient of the document, wherein said server is located within a firewall;

forwarding said encrypted document to said sever within said firewall;

decrypting said document with said server using said server's corresponding private key;

converting said document to a new date representation; and forwarding said document to said recipient.

2. The method of claim 1 wherein said recipient is located inside said firewall.

3. A method for effecting secure document delivery in any of a plurality of document formats, comprising the steps of:

encrypting said document;

forwarding said encrypted document to a server within said firewall;

decrypting said document with said server;

converting said document to a new data representation; and forwarding said document to a recipient.

4. The method of claim 3 wherein said recipient is located inside said firewall.

5. A method for effecting secure document format conversion comprising the steps of:

sending a document having a high level representation to a recipient;

intercepting said document at a secure server and performing document format conversion in a secure environment established by said server; and forwarding said converted document to a recipient in a secure fashion, within any of said server's secure environment or via a secure delivery technique.

6. An apparatus for effecting secure document delivery in any of a plurality of document formats, comprising:

means for encrypting said document with a public key of a server associated with a recipient of the document, wherein said server is located within a firewall;

means for forwarding said encrypted document to said sever within said firewall;

means for decrypting said document with said sever using said server's corresponding private key;

means for converting said document to a new data representation; and means for forwarding said document to said recipient.

7. The apparatus of claim 6 wherein said recipient is located inside said firewall.

8. An apparatus for effecting secure document delivery in any of a plurality of document formats, comprising:

means for encrypting said document;

means for forwarding said encrypted document to a server within said firewall;

means for decrypting said document with said server;

means for converting said document to a new data representation; and means for forwarding said document to a recipient.

9. The apparatus of claim 8 wherein said recipient is located inside said firewall.

10. An apparatus for effecting secure document format conversion comprising:

means for sending a document having a high level representation to a recipient;

means for intercepting said document at a secure server and performing document format conversion in a secure environment established by said server; and means for forwarding said converted document to a recipient in a secure fashion, within any of said server's secure environment or via a secure delivery mechanism.

* * * * *